United States Patent

Boerner et al.

(10) Patent No.: US 9,455,881 B2
(45) Date of Patent: Sep. 27, 2016

(54) METHOD FOR DETERMINING SYSTEM TOPOLOGY GRAPH CHANGES IN A DISTRIBUTED COMPUTING SYSTEM

(71) Applicant: International Business Machines Corporation, Armonk, NY (US)

(72) Inventors: Andreas Boerner, Stuttgart (DE); David Lebutsch, Tuebingen (DE); Cataldo Mega, Tuebingen (DE); Chun Guang Zeng, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 348 days.

(21) Appl. No.: 14/054,011

(22) Filed: Oct. 15, 2013

(65) Prior Publication Data

US 2014/0122706 A1  May 1, 2014

(30) Foreign Application Priority Data

Oct. 29, 2012 (GB) .................................. 1219365.2

(51) Int. Cl.
*G06F 15/173* (2006.01)
*H04L 12/24* (2006.01)
(Continued)

(52) U.S. Cl.
CPC ......... *H04L 41/5009* (2013.01); *G06F 9/5011* (2013.01); *G06F 9/5083* (2013.01);
(Continued)

(58) Field of Classification Search
CPC .............. G06F 9/5083; G06F 9/5072; G06F 2209/5022; G06F 11/3409; G06F 11/3442; G06F 2209/501; G06F 9/5011; H04L 41/12; H04L 41/5009; H04L 67/1008; H04L 41/5096; H04L 43/0817; H04L 43/16; H04L 41/0631; H04L 41/5019; H04L 41/5032; H04L 43/00

USPC .......................................................... 709/224
See application file for complete search history.

(56) References Cited

U.S. PATENT DOCUMENTS 5,742,795 A * 4/1998 Kussel .................. G06F 17/509
                                                    703/2
7,085,825 B1 * 8/2006 Pishevar ............. H04L 67/1095
                                                    709/204
(Continued)

FOREIGN PATENT DOCUMENTS

| WO | 2011080063 A1 | 7/2011 |
| WO | 2012094138 A2 | 7/2012 |
| WO | 2013003031 A2 | 1/2013 |

OTHER PUBLICATIONS

An et al., "Automated Negotiation with Decommitment for Dynamic Resourece Allocation in Cloud Computing," Proc. of 9th Int. Conf. on Autonomous Agents and Multiagent Systems (AAMAS 2010), May 10-14, 2010, pp. 981-988.

(Continued)

*Primary Examiner* — Daniel C Murray
(74) *Attorney, Agent, or Firm* — Cantor Colburn LLP; Rahan Uddin

(57) ABSTRACT

A distributed computing system provides at least one service, and the service is provided by resources of the distributed computing system. Resources are represented by a topology graph including storage, application and database server nodes joined by edges indicative of relationships between nodes. Predefined parameters are monitored that are indicative of operating characteristics of the distributed computing system when providing the service. Values of the predefined parameters are compared with respective predetermined performance threshold values. The performance threshold values are determined based on a service level agreement (SLA). The SLA includes a service level objective (SLO). The performance threshold values are indicative of the respective operating characteristics prior to an event. Rules are provided for selecting a combination of application, storage and database server nodes to meet the SLO for each parameter of the parameter. Data associated with the set of rules are stored in the computing system.

13 Claims, 7 Drawing Sheets

(51) Int. Cl.
*G06F 11/34* (2006.01)
*G06F 9/50* (2006.01)
*H04L 29/08* (2006.01)
*H04L 12/26* (2006.01)

(52) U.S. Cl.
CPC ....... *G06F11/3409* (2013.01); *G06F 11/3442* (2013.01); *H04L 41/0631* (2013.01); *H04L 41/12* (2013.01); *H04L 41/5019* (2013.01); *H04L 41/5096* (2013.01); *H04L 67/1008* (2013.01); *G06F 9/5072* (2013.01); *G06F 2209/501* (2013.01); *G06F 2209/5022* (2013.01); *H04L 41/5032* (2013.01); *H04L 43/0817* (2013.01); *H04L 43/16* (2013.01)

(56) References Cited

U.S. PATENT DOCUMENTS

| | | | | |
|---|---|---|---|---|
| 7,194,543 | B2* | 3/2007 | Robertson | G06Q 10/06 709/223 |
| 7,711,845 | B2* | 5/2010 | Pishevar | H04L 67/1095 709/226 |
| 7,894,372 | B2* | 2/2011 | Chu | H04L 41/12 370/255 |
| 7,979,245 | B1* | 7/2011 | Bourlatchkov | G06F 11/3409 703/2 |
| 8,145,760 | B2* | 3/2012 | Dinda | G06F 9/4887 709/226 |
| 8,175,862 | B1* | 5/2012 | Bourlatchkov | G06F 11/3409 703/14 |
| 8,190,740 | B2 | 5/2012 | Stienhans et al. | |
| 8,264,971 | B2* | 9/2012 | Alfano | H04L 41/046 370/242 |
| 8,291,110 | B2* | 10/2012 | Pishevar | H04L 67/1095 709/238 |
| 8,327,350 | B2* | 12/2012 | Chess | G06F 9/5077 717/174 |
| 8,370,802 | B2* | 2/2013 | Pacifici | G06F 9/5038 717/120 |
| 8,479,098 | B2* | 7/2013 | Kimmet | G06F 8/61 715/736 |
| 8,572,623 | B2* | 10/2013 | Bhogal | G06F 9/50 718/1 |
| 8,635,534 | B2* | 1/2014 | Kimmet | G06F 8/61 715/735 |
| 8,782,131 | B2* | 7/2014 | Pishevar | H04L 67/1095 709/203 |
| 8,806,014 | B2* | 8/2014 | Carter | G06F 9/5072 705/400 |
| 8,904,038 | B2* | 12/2014 | Pishevar | H04L 67/1095 709/238 |
| 8,930,542 | B2* | 1/2015 | Ashok | H04L 67/1031 709/223 |
| 8,930,543 | B2* | 1/2015 | Ashok | H04L 67/1031 709/223 |
| 8,972,983 | B2* | 3/2015 | Li | G06F 9/5066 370/229 |
| 9,053,161 | B2* | 6/2015 | DeLuca | G06F 17/30569 |
| 9,098,344 | B2* | 8/2015 | Chandramouli | G06F 9/505 |
| 2002/0143926 | A1* | 10/2002 | Maltz | H04L 41/0213 709/224 |
| 2002/0143928 | A1* | 10/2002 | Maltz | H04L 29/06 709/224 |
| 2002/0143929 | A1* | 10/2002 | Maltz | H04L 41/0213 709/224 |
| 2004/0054776 | A1* | 3/2004 | Klotz | H04L 41/06 709/224 |
| 2004/0059807 | A1* | 3/2004 | Klotz | H04L 41/0631 709/223 |
| 2005/0060574 | A1* | 3/2005 | Klotz | H04L 41/22 726/4 |
| 2005/0076113 | A1* | 4/2005 | Klotz | H04L 12/2602 709/224 |
| 2006/0265490 | A1* | 11/2006 | Pishevar | H04L 67/1095 709/223 |
| 2006/0268742 | A1* | 11/2006 | Chu | H04L 41/12 370/254 |
| 2007/0179826 | A1* | 8/2007 | Cutlip | G06Q 10/063 705/7.11 |
| 2008/0104247 | A1 | 5/2008 | Venkatakrishnan et al. | |
| 2009/0113437 | A1* | 4/2009 | Sedukhin | G06F 8/10 718/103 |
| 2009/0122706 | A1* | 5/2009 | Alfano | H04L 41/046 370/237 |
| 2010/0306169 | A1* | 12/2010 | Pishevar | H04L 67/1095 707/613 |
| 2011/0004565 | A1 | 1/2011 | Stephenson et al. | |
| 2011/0041066 | A1* | 2/2011 | Kimmet | G06F 8/61 715/736 |
| 2011/0055707 | A1* | 3/2011 | Kimmet | G06F 8/61 715/735 |
| 2011/0161973 | A1* | 6/2011 | Klots | G06F 17/30566 718/104 |
| 2011/0302578 | A1 | 12/2011 | Isci et al. | |
| 2012/0042061 | A1 | 2/2012 | Ayala et al. | |
| 2012/0047107 | A1 | 2/2012 | Doddavula et al. | |
| 2012/0054755 | A1 | 3/2012 | Evans | |
| 2012/0131172 | A1 | 5/2012 | Falk et al. | |
| 2012/0173708 | A1 | 7/2012 | Bartfai-Walcott et al. | |
| 2012/0173728 | A1 | 7/2012 | Haskins et al. | |
| 2012/0221314 | A1* | 8/2012 | Bourlatchkov | G06F 11/3409 703/21 |
| 2013/0031250 | A1* | 1/2013 | Pishevar | H04L 67/1095 709/224 |
| 2013/0036221 | A1* | 2/2013 | Pishevar | H04L 67/1095 709/224 |
| 2013/0166712 | A1* | 6/2013 | Chandramouli | G06F 9/505 709/223 |
| 2013/0290853 | A1* | 10/2013 | Kimmet | G06F 8/61 715/735 |
| 2014/0297874 | A1* | 10/2014 | Matsubara | G06F 17/30386 709/226 |
| 2015/0215433 | A1* | 7/2015 | Leung | H04L 43/08 709/224 |
| 2015/0296000 | A1* | 10/2015 | Chandramouli | G06F 9/505 709/203 |

OTHER PUBLICATIONS

UK Search Report for International Application No. GB1219365.2; Date of Mailing: Feb. 27, 2013, 4 pages.

* cited by examiner

METHOD FOR DETERMINING SYSTEM TOPOLOGY GRAPH CHANGES IN A DISTRIBUTED COMPUTING SYSTEM

PRIORITY

This application claims priority to Great Britain Patent Application No. 1219365.2, filed Oct. 29, 2012, and all the benefits accruing therefrom under 35 U.S.C. §119, the contents of which in its entirety are herein incorporated by reference.

BACKGROUND

The present disclosure relates generally to cloud computing, and more particularly, to determining system topology graph changes in a distributed computing system.

Cloud computing has become a popular way to offer various information technology (IT) concepts as services. The cloud computing adoption continues to grow, by integrating existing enterprise services provided by traditional IT environments.

SUMMARY

In one embodiment, a computer implemented method to determine system topology graphs in a distributed computing system is provided. The computer implemented method is executed in a distributed computing system and provides at least one service. The at least one service is provided by resources of the distributed computing system. The resources are represented by a topology graph that includes storage and application and database server nodes joined by edges indicatives of relationships between nodes. Data is associated with the topology graph being stored in the computing system. The service is an interactive and/or batch compliance archive service. One relationship between the nodes is represented by their cardinality. The application, server and storage nodes are different nodes.

The method includes receiving requests to provide the service, deploying the service on the resources in accordance with the topology graph, using the resources to provide the service, and monitoring one or more predefined parameters indicative of respective one or more operating characteristics of the distributed computing system when providing the service. The method also includes comparing values of the predefined parameters with respective predetermined performance threshold values. The performance threshold values are determined based on a service level agreement (SLA). The SLA includes at least one service level objective (SLO). The performance threshold values are indicative of the respective operating characteristics prior to an event. The event includes an occurrence of the computing system congestion.

The method also includes providing a set of rules for selecting a combination of application, storage, and database server nodes to meet the SLO for each parameter of the parameter. Data associated with the set of rules are stored in the computing system.

The method further includes, in response to a determination, at a time t0, that at least one parameter value of the one or more parameters values is higher or equal to the respective performance threshold value, using reference data and the set of rules to update the topology graph to prevent occurrence of the event. The reference data is stored in association with the service. The reference data are determined by: monitoring the one or more parameters during a time period, thereby providing monitoring data; and using the monitoring data to generate the reference data. The reference data is a table having one or more columns, each column representing a parameter of the one or more parameters, and each column including a set of parameter values each associated with a time point of the time period at which the parameter has the parameter value A computer-readable medium and a system are also provided.

BRIEF DESCRIPTION OF THE SEVERAL VIEWS OF THE DRAWINGS

In the following, embodiments of the invention will be described in greater detail by way of example only making reference to the drawings in which.

DETAILED DESCRIPTION

In the following, like numbered elements in the figures either designate similar elements or designate elements that perform an equivalent function. Elements which have been discussed previously will not necessarily be discussed in later figures if the function is equivalent.

Figure 1:
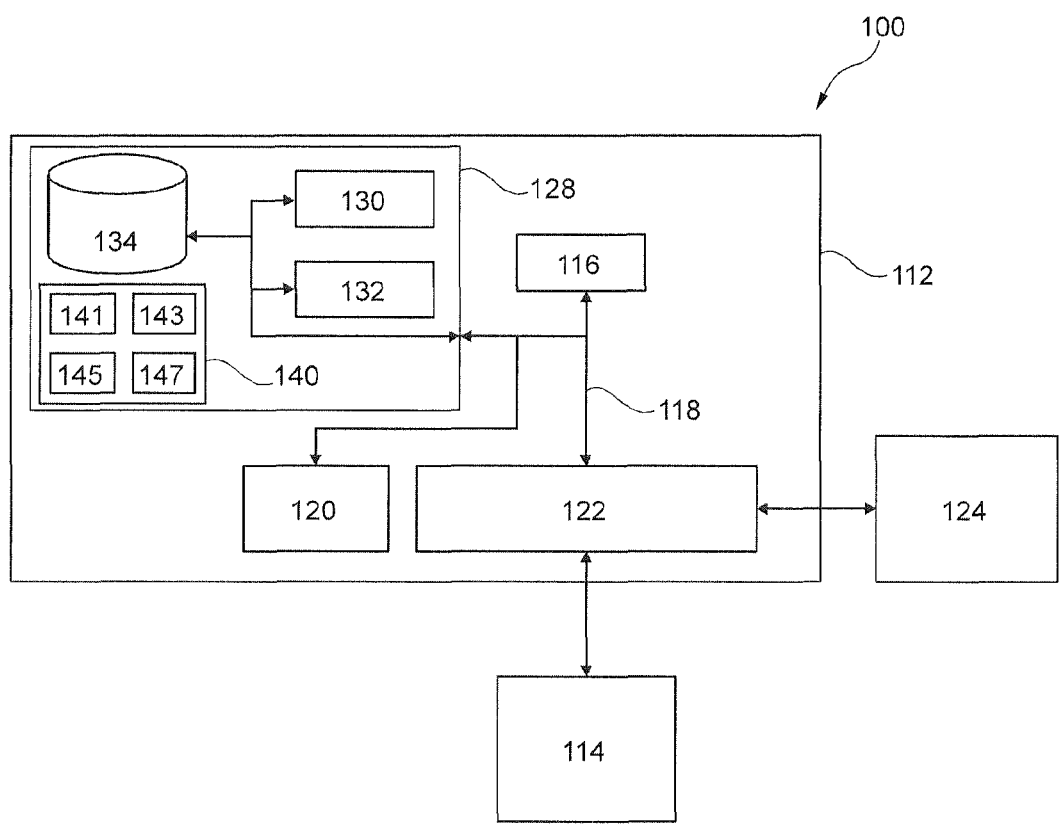
FIG. 1 shows a computer cloud system node.

FIG. 1 shows a schematic of an exemplary cloud computing node. cloud computing node 100 is only one example of a suitable cloud computing node and is not intended to suggest any limitation as to the scope of use or functionality of the embodiments described herein. Regardless, cloud computing node 100 is capable of being implemented and/or performing any of the functions described herein.

In cloud computing node 100 there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules include routines, programs, objects, components, logic, data structures, and so on that perform particular tasks or implement particular abstract data types. The exemplary computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node 100 is shown in the form of a general-purpose computing device. The components of computer system/server 12 may include, but are not limited to, one or more processors or processing units 16, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 12, and it includes both volatile and non-volatile media, removable and non-removable media.

System memory 128 may include computer system readable media in the form of volatile memory, such as random access memory (RAM) and/or cache memory (not shown). Computer system/server 112 may further include other removable/non-removable, volatile/non-volatile computer system storage media. By way of example only, a storage system 134 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of the present subject matter.

Computer system/server 112 may also communicate with one or more external devices 14 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interface(s) 122. Still yet, computer system/server 12 can communicate with one or more networks such as a local area network (LAN), a general wide area network (WAN), and/or a public network (e.g., the Internet) via network adapter 120. As depicted, network adapter 20 communicates with the other components of computer system/server 112 via bus 118. It should be understood that although not shown, other hardware and/or software components could be used in conjunction with computer system/server 112. Examples include, but are not limited to: microcode, device drivers, redundant processing units, external disk drive arrays, RAID systems, tape drives, and data archival storage systems, etc.

Program/utility 140 having a set (at least one) of program modules 141-147 may be stored in memory 128 by way of example, and not limitation, as well as an operating system, one or more application programs, other program modules, and program data. Each of the operating system, one or more application programs, other program modules, and program data or some combination thereof, may include an implementation of a networking environment.

The cloud computing node may be part of a distributed computing system (e.g. a cloud computing system) providing at least one service. The at least one service is provided by resources of the distributed computing system. The resources are represented by a topology graph comprising storage, application and database server nodes joined by edges indicatives of relationships between nodes. Data associated with the topology graph may be stored in a storage capacity of the computing node.

Program/utility 140 includes a resource allocating module 141, and a monitoring module 143.

The processor 116 may receive requests to provide the at least one service. The resource allocating module 141 contains computer-executable code which enable the processor 116 to deploy the at least one service on the resources in accordance with the topology graph, and to use the resources to provide the at least one service.

The monitoring module 143 contains computer-executable code which enables the processor 116 to dynamically monitor one or more predefined parameters indicatives of respective one or more operating characteristics of the distributed computing system when providing the at least one service.

The monitoring module 143 further contains computer-executable code which enables the processor 116 to compare values of the one or more predefined parameters with respective predetermined performance threshold values, wherein the performance threshold values are determined based on a service level agreement, SLA, wherein the SLA comprises at least one service level objective, SLO. The performance threshold values are indicatives of the respective operating characteristics prior to an event.

The memory 128 is further shown as containing data 145 associated with a set of rules for selecting a combination of application, storage and database server nodes to meet the at least one SLO for each parameter of the one or more parameter. The data 145 may be loaded from a storage capacity of the cloud computing node into the memory 128 when the method is executed.

The memory 128 is further shown as containing reference data 147. The reference data are previously determined by monitoring the one or more parameters during a time period and using the monitoring data to generate the reference data. The reference data comprises a table having one or more columns, each column representing a parameter of the one or more parameters, each column comprising a set of parameter values each associated with a time point transaction load point of the time period at which the parameter has its specific the parameter value.

The monitoring module 143 further contains computer-executable code which enables the processor 116 to use reference data and the set of rules to update the topology graph to prevent occurrence of the event, in response to a determination, at a time t0, that at least one parameter value of the one or more parameters values is higher or equal to the respective performance threshold value.

Figure 2:
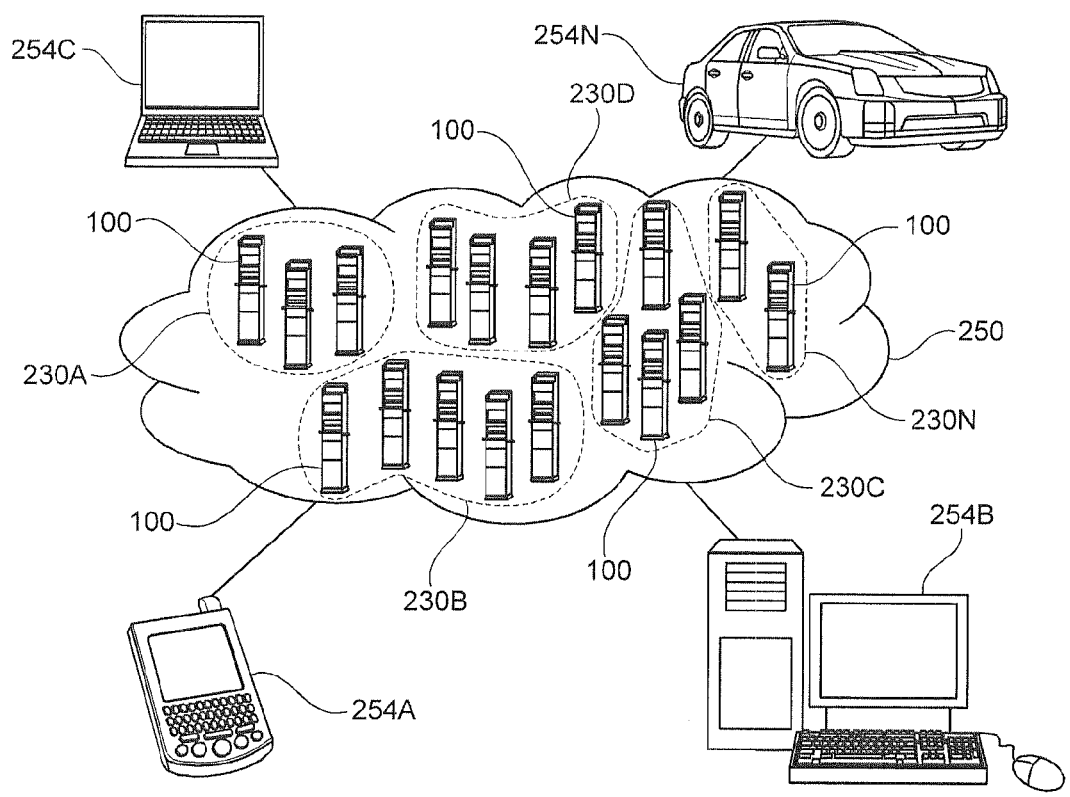
FIG. 2 shows a computer cloud computing environment.

FIG. 2 depicts illustrative cloud computing environment 250. As shown, cloud computing environment 250 comprises one or more service providers 230A-230N, each of the service providers comprises one or more cloud computing nodes in addition to the cloud computing node 100 as described with reference to FIG. 1. Computing devices such as, for example, personal digital assistant (PDA) or cellular telephone 254A, desktop computer 254B, laptop computer 254C, and/or automobile computer system 254N may communicate cloud computing nodes. This allows for infrastructure, platforms and/or software to be offered as services (as described above in Section I) from cloud computing environment 250, so as to not require each client to separately maintain such resources. It is understood that the types of computing devices 254A-N shown in FIG. 2 are intended to be illustrative only and that cloud computing environment 250 can communicate with any type of computerized device over any type of network and/or network/addressable connection (e.g., using a web browser).

Figure 3:
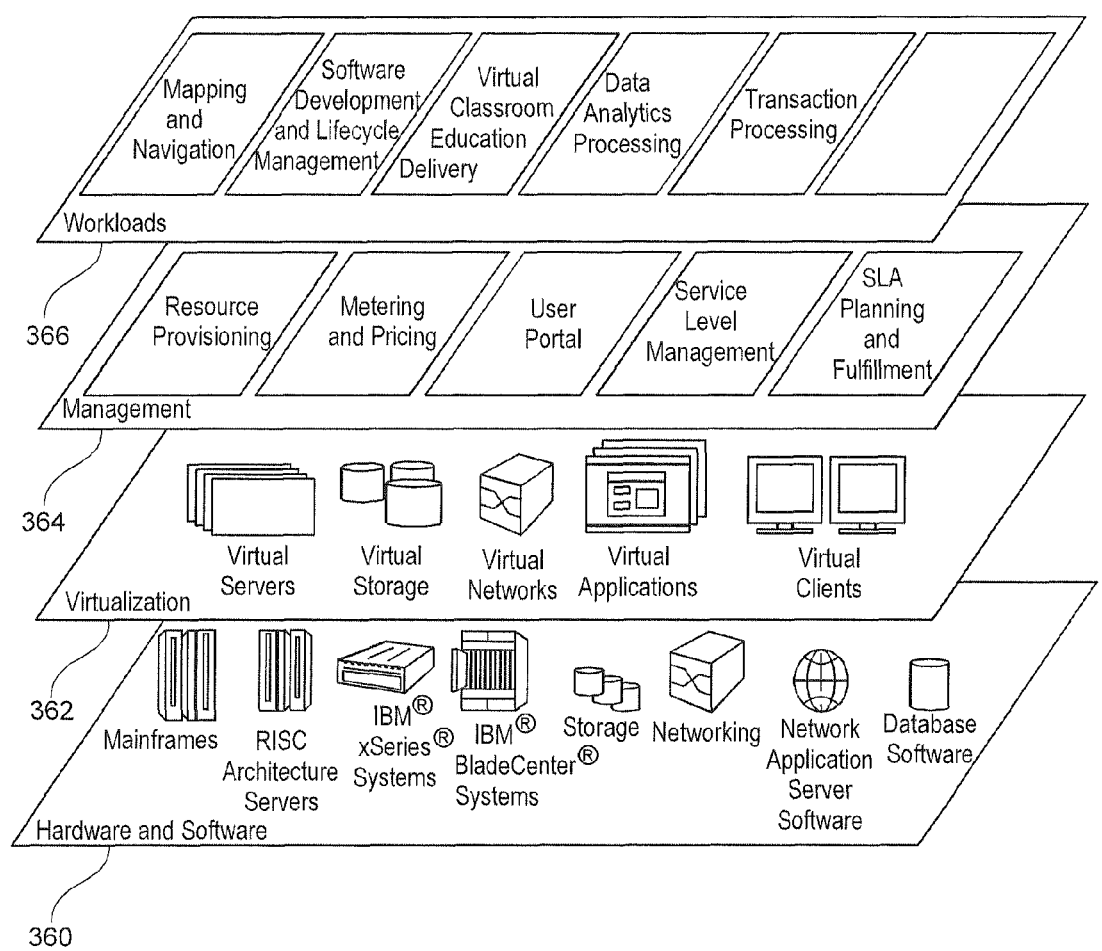
FIG. 3 shows computer cloud abstraction model layers.

Referring now to FIG. 3, a set of functional abstraction layers provided by cloud computing environment 250 (FIG. 2) is shown. It should be understood in advance that the components, layers, and functions shown in FIG. 3 are intended to be illustrative only, and the invention is not limited thereto. As depicted, the following layers and corresponding functions are provided:

Hardware and software layer 360 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software, in one example IBMWebSphere® application server software; and database software, in one example IBM DB2®, database software. (IBM, zSeries, pSeries, xSeries, BladeCenter, WebSphere, and DB2 are trademarks of International Business Machines Corporation in the United States, other countries, or both.)

Virtualization layer 362 provides an abstraction layer from which the following exemplary virtual entities may be provided: virtual servers; virtual storage; virtual networks, including virtual private networks; virtual applications; and virtual clients.

Management layer 364 provides the exemplary functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for users and tasks, as well as protection for data and other resources. User portal provides access to the cloud computing environment for both users and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 366 provides functionality for which the cloud computing environment is utilized. Examples of workloads and functions which may be provided from this layer include: mapping and navigation; software development and lifecycle management; virtual classroom education delivery; data analytics processing; transaction processing; and cloud roaming services.

A workload may be a unit of work being performed by the distributed computing system.

For example, a workload associated with a service delivered by the distributed computing system may be a representative mix of primitive operation performed against the system. As an example, in a typical behavior of a number of interactive compliance archive users, the end users may perform a number of tasks in a given time frame. For example, the end user may log on to the archive of the distributed computing system, then navigate to its workplace and open his in-workbasket. Next, he picks a work item such as an insurance claim and may start reading the claim. A few minutes later, he opens the Search user interface (UI) and performs a search against the archive to find collateral documents relevant to the claim. The search yields a hit list with twenty documents, out of which he selects to retrieve three one after the other and annotates the $3^{rd}$ updating the document. After many iterations of the same mix of operation he eventually log out of the system.

Using the example above, the workload associated with the service may be synthesized into a mix of primitive operations described as:
 a representative mix of Create, Retrieve, Update, Delete (CRUD) operations
 a number of simple and complex search operations
 a typical corpus of data consisting of document of certain types and sizes The following table outlines typical compliance archive workload elements together with their associated SLA and parameters (e.g. KPI) such as the response time and the throughput.

| Workload Element | Primitive operation | Payload unit | KPI | SLA |
|---|---|---|---|---|
| Interactive CRUD | Create | 100 KB | Response time | 1 s |
| | Update | | Resp. time | 1 s |
| | Annotate | | Resp. time | 1 s |
| | Retrieve | | Resp. time | 1 s |
| | Delete | | Resp. time | 2 s |
| | Search | 10 hits | Resp. time | 3 s |
| e-DISCOVERY | Set on hold | # docs | Throughput | 1000 |
| | Expunge | | | |
| Batch tasks | Bulk load | # docs | Throughput | 50/s |
| | Holds | # docs | Throughput | 100/s |
| | Expunge | # docs | Throughput | 50/s |

In order to determine the reference data and the rules that are associated with parameters of the workload described above, a reference test system may be used. It may be based on a specific platform and optimized for the service such as the compliance service. For example, the reference test system may be an IBM Power System creating 2 logical partitions (LPAR) with 2×CPU each and 12 GB of memory. The underling file system is based on IBM GPFS using an IBM storage subsystem. The system may be split in a database and an application layer. In another example, the reference test system may be the same as the 'real' computing system.

Next, baseline performance tests for the primitive operations using a representative corpus of test data may be performed. As an example such a test probe may be used to simulate interactive users when accessing the compliance archive performing the mix of operations: i.e., Interactive Workload={Logon, loop over {folder creation, document import, record declaration, traversing the folder tree, performs a simple search, retrieve} Think time between 1.5 and 12 seconds} re-iterate}. This workload may be performed using document sizes between 1 KB to 1 MB with an average size of ~140 KB.

Parameters used to monitor the test reference system may be for example:
- Number of daily archive operations performed
- Number of transactions per operation
- Number of document loaded per second
- CRUD response time per document
- Search response time per document
- Document/Page size per request
- Document/Page type per request.

To generate reference data for the test reference system, the parameters above are monitored during a representative time period of the interactive workload described above, a batch workload or a mix of them. The test reference system may provide minimal required resources to run interactive workload, batch workload and/or a mixture of them.

Figure 4:
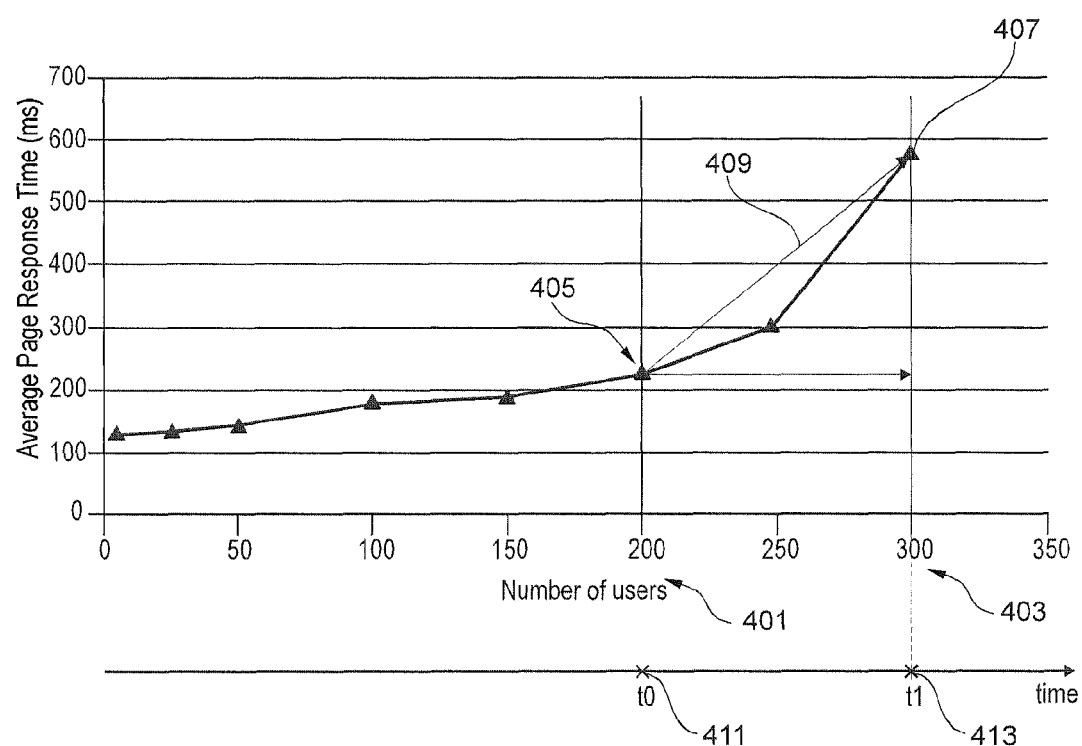
FIG. 4 shows the response time per user versus the number of transactions.

For example, the reference data may contain the number of transactions per operation and associated response time in addition to the time at which the parameter (i.e. number of transactions and associated response time) has a specific value. This is represented in FIG. 4 as a graph of an interactive workload performance baseline. FIG. 4 shows the response time per user (or transaction) versus the number of transactions for the interactive workload described above. The number of transactions is increasing with time. At 300 simulated users (or transactions) 403, operations response time suffers and the service level objectives can no longer be met.

Figure 5:
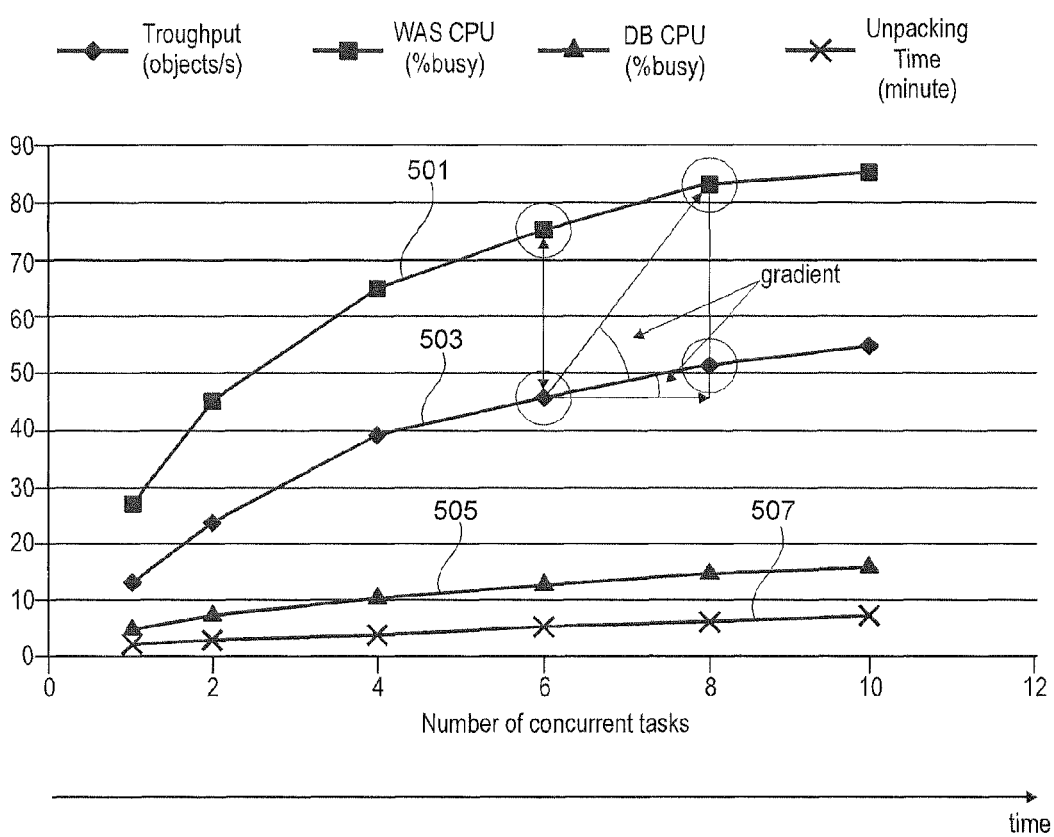
FIG. 5 different parameter values as function of number of concurrent tasks.

The reference data is also represented in FIG. 5 for a batch load workload but showing different parameter values. FIG. 5 shows the number of concurrent tasks generated by the test reference system in response to user's requests as function of the web application server (WAS) CPU usage 501, throughput 503, DB CPU 505 and unpacking time 507. FIG. 5 shows that the application server reaches saturation (WAS CPU usage >80%) at around 8 concurrent load tasks. The 8 tasks generate a throughput of 50 documents per seconds and the system has reached a critical level. Thus, the test reference system may avoid more than 6 concurrent load tasks. With a slightly lower throughput of 45 documents per seconds the system is back at 75% CPU consumption and much better system stability.

Figure 6:
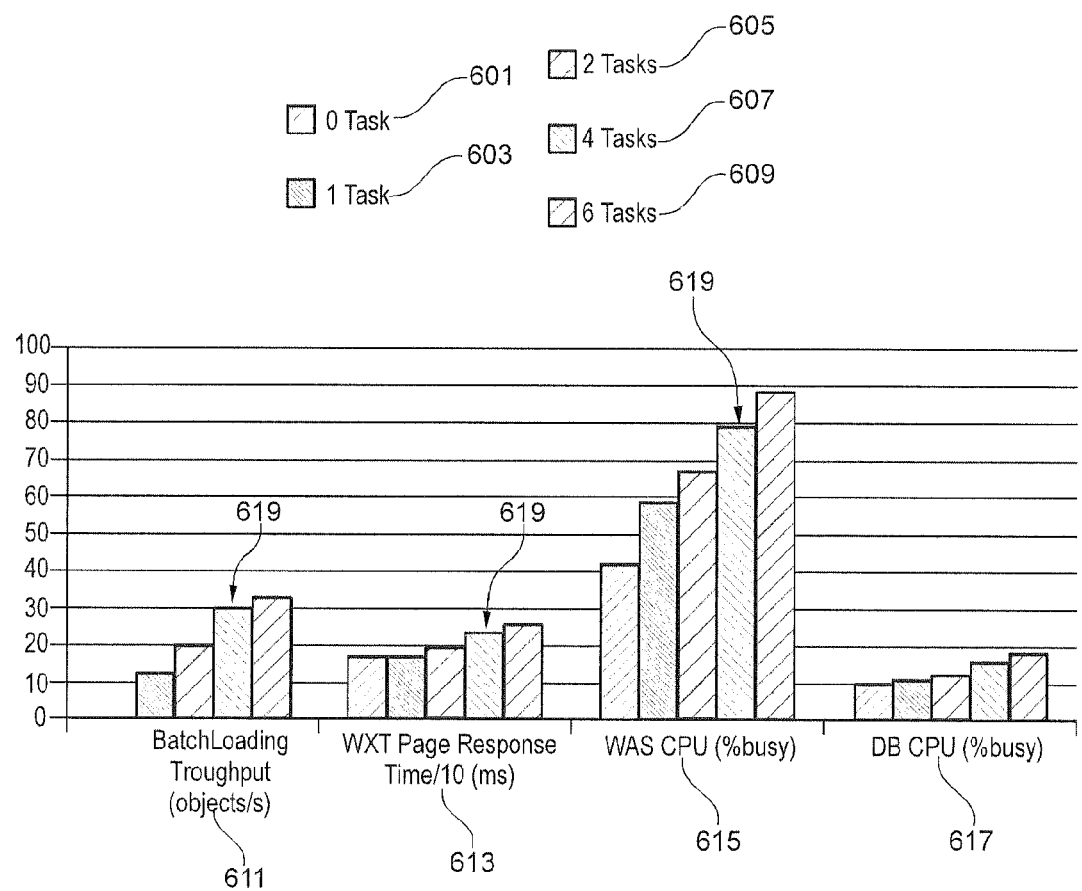
FIG. 6 shows a histogram of parameter values for different number of tasks.
Figure 7:
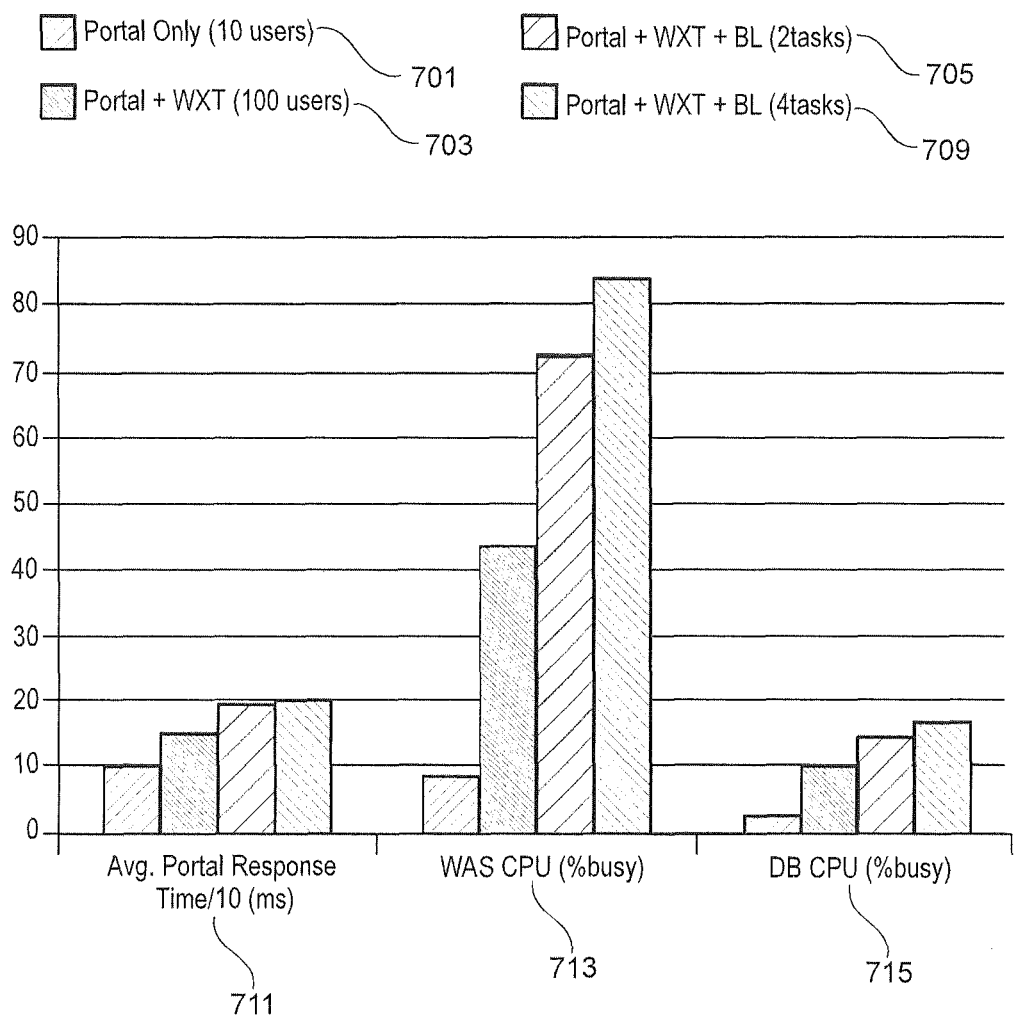
FIG. 7 shows a histogram of parameter values for a mix of interactive, batch and administrative operations workload.

The reference data is also represented in FIG. 6 and FIG. 7 which show parameters (611-617 and 711-715) values versus number of concurrent tasks (601-609 and 701-709) for a mix (mix1) of interactive and batch operations workload and for another mix (mix2) interactive, batch and administrative operations workload respectively. For example, values at 619 meet the service level objectives (e.g. WAS CPU usage is below 80%).

FIG. 6 shows that adding administrative operations to the mix of FIG. 5 has a major impact on the interactive workload characteristics. When a combination of all 3 workloads is deployed then the number of interactive virtual users should be kept at 100 and the load tasks at 2.

The performance threshold value associated with each parameter may be determined using the reference data. For example, at 200 concurrent users 401 of FIG. 4, the response time is at best, smaller load oscillations can be compensated and Web Application Server CPU reserves are sufficient for the OS to run smoothly. At 300 simulated users (or transactions) 403, operations response time suffers and the service level objectives can no longer be met and the system may be collapsing. Assuming that the SLO is an average response time below 300 ms, the performance threshold value associated with the response time may be equal the response time when 200 concurrent users are served. That is, the response time threshold value may be equal to 200 ms.

This may provide the system with a grace time period between t0 411 and t1 413 to react to the coming event of 300 users requests concurrently running.

During run time of a real computing system providing at least one service such as the interactive workload, wherein the at least one service is provided by resources which are represented by an initial topology graph, the parameter values are collected (measured) and compared against the respective performance threshold value. For example, the response time values for an interactive workload may be collected and compared with the execution time threshold value of e.g. 200 ms. When the point 200 is reached i.e. the response time value is 200 ms, the distance from current load to the saturation point is computed. This is done, for example, by simply determining the 2 intersection points 405 and 407 of FIG. 4 and their respective slope 409 (i.e. the two points are fitted with a linear mathematical function). The saturation point 407 is defined as the point where a specific service level objective starts getting violated.

Knowing when a set of SLOs start getting violated, together with the knowledge about the resources afflicted allows updating the initial topology graph using predetermined rules.

The rules may be determined also using the reference data. For example, at 200 concurrent user requests 401, the Database to Application Server CPU-ratio is ~1:3. That is, a 2 CPU Data Base node may serve up to 3 Application Sever nodes running an interactive workload. In this case, the rule that requires a Database to Application Server CPU-ratio of ~1:3 may be chosen.

In another example of the document load workload, a rule requiring the Database to Web Application Server CPU-ratio of 1:7 may be chosen. That is a 2 CPU Database node can server up to 7 Application Sever nodes running a load workload without violating the SLOs.

In the mix of interactive and batch load (mix1), a maximum of 4 parallel tasks in addition to a number between 150-200 concurrent users should be enforced to avoid violating the SLOs. The Database to Application Server CPU-ration should be ~1:4 to satisfy the SLOs, and may be chosen as a rule when all the interactive and batch loads are concurrently running on the system.

Another rule may be derived for the mix of interactive and batch loads as a combination of separated rules for the interactive and the batch loads. The separated rules are derived as described above for each of the interactive and batch loads, when the two loads are concurrently running For example, the split of application servers for the mix of FIG. 6 may be done based on response time and throughput requirements in ratios of 1:3, 2:2, 3:1 versus one Data Base Server. That is, given one DB node, one may have 4 application server nodes in a mix of: a) 1 Batch Loader (BL) node and 3 End user Workplace application (WXT) nodes, b) 2 LB nodes and 2 WXT nodes, and c) 3 BL nodes and 1 WXT node.

The set of rules that may be derived for the example services described above are summarized in the table below:

| Rule | Rules |
|---|---|
| 1 | When number of users grow above 300 start adding new App Server |
| 2 | When number of concurrent v-users falls below 220 reduced App Server by one if number of App Servers >= 2 |
| 3 | DB to App Server ratio for interactive load is 1:3 |

| Rule | Rules |
|---|---|
| 4 | In a load scenario the Database to Application Server CPU-ratio is 1:7. |
| 5 | DB to App Server ratio for Mix1 load is 1:4 |
| 6 | DB to App Server ratio for Mix 2 load is 1:4 |
| 7 | When more than 8 tasks are scheduled then use 2 App Servers for load workload |
| 8 | When splitting a mixed workload node then dedicated nodes to pure workloads |

Using the rules above, the initial topology graph may be updated at any time between the time at which the performance threshold value is reached e.g. the time t0 411 at which the number of users is 200 and the time at which the saturation of the system may happen e.g. the time t1 413 at which the number of users is 300. For example, considering the case of a batch load that may require one additional application server to avoid violation of the SLOs. In this case the method may add one application server to the resources of the initial topology graph so that together may represent the updated topology graph (the method may also add more than one application servers, for example, if the user requests must be executed in a very short time period by splitting them between two application servers). However, knowing that the initial topology graph is already represented by one DB server and 7 application servers, in order to satisfy the rule 4 in the table above (i.e. 1:7) a new database server may be also added in addition to the required one application server to the updated topology graph.

As described above, a computer-implemented method for determining system topology graphs in a distributed computing system is provided. The computer implemented method is executed in a distributed computing system and provides at least one service. The service is provided by resources of the distributed computing system. The resources are represented by a topology graph that includes storage and application and database server nodes joined by edges indicatives of relationships between nodes. Data is associated with the topology graph being stored in the computing system. The service may be for example an interactive and/or batch compliance archive service. One relationship between the nodes is represented by their cardinality. The application, server and storage nodes may be different nodes. The method includes receiving requests to provide the at least one service, deploying the at least one service on the resources in accordance with the topology graph, using the resources to provide the at least one service, monitoring one or more predefined parameters indicatives of respective one or more operating characteristics of the distributed computing system when providing the at least one service, and comparing values of the one or more predefined parameters with respective predetermined performance threshold values, wherein the performance threshold values are determined based on a service level agreement, SLA, wherein the SLA comprises at least one service level objective, SLO, the performance threshold values being indicatives of the respective operating characteristics prior to an event. The event may be, for example, occurrence of the computing system congestion.

The computer-implemented method also includes providing a set of rules for selecting a combination of application, storage and database server nodes to meet the at least one SLO for each parameter of the one or more parameter, wherein data associated with the set of rules are stored in the computing system. In response to a determination, at a time t0, that at least one parameter value of the one or more parameters values is higher or equal to the respective performance threshold value, the method includes using reference data and the set of rules to update the topology graph to prevent occurrence of the event, the reference data being stored in association with the at least one service, wherein the reference data are determined by monitoring the one or more parameters during a time period, thereby providing monitoring data, and using the monitoring data to generate the reference data. The reference data includes a table having one or more columns, where each column represents a parameter of the one or more parameters, and each column includes a set of parameter values each associated with a time point of the time period at which the parameter has the parameter value. The table may be stored in a memory of the computing system.

The monitoring and the comparing steps may be dynamically executed (real time execution) and may be repeated until a decision to update the topology graph may be taken in step g). In addition, the update of the topology graph may be performed using available resources in the computing system. Alternatively, the update may be performed using resources that are allocated for other tasks for which the computing system may give a lower priority.

The set of rules may be determined using the reference data by, for example, correlating at a given time the values of the one or more parameters that may indicate the operating characteristics of at least one of the application, storage and database server nodes and therefrom deducing a combination of application, storage and database server nodes that meets the at least one SLO.

These features may be advantageous, because the elasticity of the computing system may be paired with the present method to dynamically provision and de-provision system resources for achieving higher system utilization. This may be done by dynamically orchestrating the workloads associated with the services. In other terms, as the load changes, the topology graph may change accordingly. For example, as long as the at least one SLO is satisfied the topology graph may be changed in order to minimize resource consumption, freeing up resources to concurrently run other services in the computing system, and thus, may increase the overall system utilization and reduce operations cost.

Another advantage may be that the time and system resources required to update a topology graph may be reduced. The present method uses predefined rules and accurate reference data which may be stored in tables in the memory of the computing system for fast lookup. This may help to determine the adequate topology graph representing minimal required resources in a short time period. This is in contrast to conventional systems that employ a traditional delivery model or use approaches based on compute intensive queuing models.

Another advantage may be that the updated topology graph may comply with service level objectives at the individual component level by monitoring for example adequate parameters associated with the component.

According to one embodiment, the distributed computing system is a cloud computing system. The at least one service may include any type and form of SaaS, PaaS and/or IaaS services. This may be advantageous as the present method may be applied in different distributed computing systems such as the cloud computing system, grid computing system and cluster computing systems.

According to one embodiment, the at least one SLO includes a condition specification identifying a condition that is selected from the group consisting of: the average execution time of the at least one service per user is below a predetermined execution time threshold value; and the CPU usage of the at least one service is below a preset maximum CPU usage value.

This may be advantageous as it may increase the quality of the service provided by the computing system at a minimal cost. For example, the at least one service may be represented by a mix of primitive operations: i.e. create, retrieve, update, delete, search, discover and dispose, issued with a certain pattern against relevant documents of various types. In order to satisfy the end user requests, the computing system may perform the respective operation with a predefined quality and within an agreed upon response time e.g. the execution time threshold value.

According to one embodiment, the one or more predefined parameters comprises the execution time of the at least one service, wherein the performance threshold value associated with the execution time is equal to the execution time threshold value minus a predetermined execution time shift value.

This may be advantageous as it may provide a preventive method that may avoid potential system congestions and thus violation of the at least one SLO. This is because, the performance threshold value is defined such that it provides the computing system a grace time period before the potential congestion may happen, during which the computing system may decide and react to avoid the potential congestion.

According to one embodiment, the reference data are determined using empirical data obtained by the same computing system at a previous time and/or using a simulation based on a model of the computing system. The model may be a representative workload model, since it may generate workloads which resemble those that the computing system faces.

In another example, the reference data may be determined by simulating user workload profiles on the same computing system.

This may be advantageous as it may provide reliable reference data since different methods of generating the reference data that may be cross checked against each other.

According to one embodiment, using the reference data includes for each parameter of the one or more parameters: reading the reference data; determining a first time point of the time period corresponding to the performance threshold value associated with the parameter, wherein the first time point corresponds to the time t0; and generating from the reference data a subset of data containing the parameter values determined during the time between the first time point and the end time point of the time period.

The time period may be a representative time period, and the end time point may be previous to the time t0.

The determining may also include aligning the time period with the time t0 and determining the first time point of the time period as the time point equal to t0 and/or within a predefined time range around t0. For example, the first time point may be within the interval [t0−x, t0+x], wherein x=15 min.

This may be advantageous, as it may provide a subset of data that may accurately describe the expected parameter values in a time period following the time t0.

According to one embodiment, the updating includes reading the subset of data; determining a second time point of the time period corresponding to a second parameter value of the parameter; comparing the performance threshold value with the second parameter value; and updating the topology graph based on the comparison result and the set of rules.

According to one embodiment, the method further includes reading the subset of data; producing a mathematical function representing the behavior of the variation of parameter values of the parameter; using the mathematical function to determine a second time point of the time period and its corresponding second parameter value of the parameter; comparing the performance threshold value with the second parameter value; and updating the topology graph based on the comparison result and the set of rules.

The mathematical function may model the variations of the parameter values as function of other parameter values of the one or more parameters for an increasing time interval. In another example, the mathematical function may model the variations of the parameter values as function of time.

This may be advantageous as the mathematical function may provide an estimation of the parameter values at any time point following the time t0.

According to one embodiment, the method also includes, in case the second parameter value is higher than the performance threshold value and the second parameter value is violating the at least one SLO, allocating additional resources to the at least one service, thereby updating the topology graph and the associated stored data in accordance with the set of rules.

For example, in case the second parameter value does not violate the at least one SLO, the topology graph of the resources may still be used without requiring update.

According to one embodiment, the allocating comprises: determining one or more additional resources representing one or more updated topology graphs respectively to perform the at least one service, assigning to each of the one or more updated topology graphs a ranking value, and sorting by ranking value the one or more updated topology graphs; and selecting the updated topology graph having the highest ranking value from the one or more updated topology graphs.

According to one embodiment, the ranking value comprises a cost of using resources represented by the updated topology graph. This may be advantageous, as the choice for the right topology graphs may be made with the aid of a cost optimization function that may minimize the cost and maximize utilization.

According to one embodiment, the method further includes, in case the second parameter value is smaller than the performance threshold value, de-allocating resources to the at least one service, thereby updating the topology graph and the associated stored data in accordance with the set of rules.

According to one embodiment, the de-allocating includes determining resources representing a second topology graph to perform the at least one service at the second time point, comparing the current topology graph with the second topology graph, and de-allocating resources based on the comparison.

This may be advantageous as it may allow an efficient use of resources by providing additional free resources that may be used by other concurrent service requests.

The set of rules used to determine the first, second and third topology graphs may be determined separately for each one of the three services or in combination. For example, the first topology graph may be determined using a set of rules that are determined using parameters associated with the first service only when the three services are deployed at the same time by the computing system. In the other case, the first topology graph may be determined using a set of rules that are determined using parameters associated with first, second and the third services i.e. parameters determined when the three services are deployed at the same time by the computing system.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The term "cloud computing" as used herein refers to a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics:

On-demand self-service. A consumer can unilaterally provision computing capabilities, such as server time and network storage, as needed automatically without requiring human interaction with each service provider.

Broad network access. Capabilities are available over the network and accessed through standard mechanisms that promote use by heterogeneous thin or thick client platforms (e.g., mobile phones, tablets, laptops, and workstations).

Resource pooling. The provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, and network bandwidth.

Rapid elasticity. Capabilities can be elastically provisioned and released, in some cases automatically, to scale rapidly outward and inward commensurate with demand. To the consumer, the capabilities available for provisioning often appear to be unlimited and can be appropriated in any quantity at any time.

Measured service. cloud systems automatically control and optimize resource use by leveraging a metering capability1 at some level of abstraction appropriate to the type of service (e.g., storage, processing, bandwidth, and active user accounts). Resource usage can be monitored, controlled, and reported, providing transparency for both the provider and consumer of the utilized service.

Service Models:

Software as a Service (SaaS). The capability provided to the consumer is to use the provider's applications running on a cloud infrastructure2. The applications are accessible from various client devices through either a thin client interface, such as a web browser (e.g., web-based email), or a program interface. The consumer does not manage or control the underlying cloud infrastructure including network, servers, operating systems, storage, or even individual application capabilities, with the possible exception of limited user-specific application configuration settings.

Platform as a Service (PaaS). The capability provided to the consumer is to deploy onto the cloud infrastructure consumer-created or acquired applications created using programming languages, libraries, services, and tools supported by the provider. 3 The consumer does not manage or control the underlying cloud infrastructure including network, servers, operating systems, or storage, but has control over the deployed applications and possibly configuration settings for the application-hosting environment.

Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, and deployed applications; and possibly limited control of select networking components (e.g., host firewalls).

Deployment Models:

Private cloud. The cloud infrastructure is provisioned for exclusive use by a single organization comprising multiple consumers (e.g., business units). It may be owned, managed, and operated by the organization, a third party, or some combination of them, and it may exist on or off premises.

Community cloud. The cloud infrastructure is provisioned for exclusive use by a specific community of consumers from organizations that have shared concerns (e.g., mission, security requirements, policy, and compliance considerations). It may be owned, managed, and operated by one or more of the organizations in the community, a third party, or some combination of them, and it may exist on or off premises.

Public cloud. The cloud infrastructure is provisioned for open use by the general public. It may be owned, managed, and operated by a business, academic, or government organization, or some combination of them. It exists on the premises of the cloud provider.

Hybrid cloud. The cloud infrastructure is a composition of two or more distinct cloud infrastructures (private, community, or public) that remain unique entities, but are bound together by standardized or proprietary technology that enables data and application portability (e.g., cloud bursting for load balancing between clouds).

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

It is understood that one or more of the aforementioned embodiments may be combined as long as the combined embodiments are not mutually exclusive.

What is claimed is:

1. A computer implemented method executed in a distributed computing system providing at least one service, wherein the at least one service is provided by resources of the distributed computing system, wherein the resources are represented by a topology graph comprising storage, application and database server nodes joined by edges indicative of relationships between nodes, wherein data associated with the topology graph being stored in the computing system, the method comprising:
receiving requests to provide the at least one service;
deploying the at least one service on the resources in accordance with the topology graph;
using the resources to provide the at least one service;
monitoring one or more predefined parameters indicative of respective one or more operating characteristics of the distributed computing system when providing the at least one service;
comparing values of the one or more predefined parameters with respective predetermined performance threshold values, wherein the performance threshold values are determined based on a service level agreement, SLA, wherein the SLA comprises at least one service level objective, SLO, the performance threshold values being indicative of the respective operating characteristics prior to an event;

providing a set of rules for selecting a combination of application, storage and database server nodes to meet the at least one SLO for each parameter of the one or more parameters, wherein data associated with the set of rules are stored in the computing system;

in response to a determination, at a time t0, that at least one parameter value of the one or more parameters values is higher or equal to the respective performance threshold value, using reference data and the set of rules to update the topology graph to prevent occurrence of the event, the reference data being stored in association with the at least one service, wherein the reference data are determined by:

monitoring the one or more parameters during a time period, thereby providing monitoring data; and using the monitoring data to generate the reference data, wherein the reference data comprises a table having one or more columns, each column representing a parameter of the one or more parameters, each column comprising a set of parameter values each associated with a time point of the time period at which the parameter has the parameter value; and redeploying resources based on the updated topology graph.

2. The method according to claim 1, wherein the distributed computing system is a cloud computing system.

3. The method according to claim 2, wherein the at least one SLO comprises a condition specification identifying a condition that is selected from the group consisting of:

the average execution time of the at least one service per user is below a predetermined execution time threshold value; and the CPU usage of the at least one service is below a preset maximum CPU usage value.

4. The method according to claim 3, wherein the one or more predefined parameters comprises the execution time of the at least one service, wherein the performance threshold value associated with the execution time is equal to the execution time threshold value minus a predetermined execution time shift value.

5. The method according to claim 4, wherein the reference data are determined using empirical data obtained by the same computing system at a previous time and/or using a simulation based on a model of the computing system.

6. The method according to claim 5, wherein using the reference data comprises for each parameter of the one or more parameters:

reading the reference data;

determining a first time point of the time period corresponding to the performance threshold value associated with the parameter, wherein the first time point corresponds to the time t0;

generating from the reference data a subset of data containing the parameter values determined during the time between the first time point and the end time point of the time period.

7. The method according to claim 6, wherein the updating comprises:

reading the subset of data;

determining a second time point of the time period corresponding to a second parameter value of the parameter;

comparing the performance threshold value with the second parameter value;

updating the topology graph based on the comparison result and the set of rules.

8. The method according to claim 6, further comprising:

reading the subset of data;

producing a mathematical function representing the behavior of the variation of parameter values of the parameter;

using the mathematical function to determine a second time point of the time period and its corresponding second parameter value of the parameter;

comparing the performance threshold value with the second parameter value; and updating the topology graph based on the comparison result and the set of rules.

9. The method according to claim 8, further comprising:

in case the second parameter value is higher than the performance threshold value and the second parameter value is violating the at least one SLO, allocating additional resources to the at least one service, thereby updating the topology graph and the associated stored data in accordance with the set of rules.

10. The method according to claim 8, further comprising:

in case the second parameter value is smaller than the performance threshold value, de-allocating resources to the at least one service, thereby updating the topology graph and the associated stored data in accordance with the set of rules.

11. The method according to claim 10, wherein the at least one service comprises a first, a second and a third service, the method further comprising: for each service of the first, second and the third services executing the deploying, monitoring, comparing, providing, and update, using respective reference data, wherein the reference data are determined for each one of the first, second and the third services while the computing system provides the first, second and the third services at the same time; deploying the first, second and third services on resources in accordance with the first, second and third topology graph respectively; using the resources to provide the first, second and third services.

12. A non-transitory computer-readable medium executable in a distributed computing system providing at least one service, wherein the at least one service is provided by resources of the distributed computing system, wherein the resources are represented by a topology graph comprising storage, application and database server nodes joined by edges indicative of relationships between nodes, wherein data associated with the topology graph being stored in the computing system, the computer-readable medium comprising computer-readable program code embodied therewith which, when executed by a processor, cause the processor to execute a method, the method comprising:

receiving requests to provide the at least one service;

deploying the at least one service on the resources in accordance with the topology graph;

using the resources to provide the at least one service;

monitoring one or more predefined parameters indicative of respective one or more operating characteristics of the distributed computing system when providing the at least one service;

comparing values of the one or more predefined parameters with respective predetermined performance threshold values, wherein the performance threshold values are determined based on a service level agreement, SLA, wherein the SLA comprises at least one service level objective, SLO, the performance threshold values being indicative of the respective operating characteristics prior to an event;

providing a set of rules for selecting a combination of application, storage and database server nodes to meet the at least one SLO for each parameter of the one or more parameters, wherein data associated with the set of rules are stored in the computing system;

in response to a determination, at a time t0, that at least one parameter value of the one or more parameters values is higher or equal to the respective performance threshold value, using reference data and the set of rules to update the topology graph to prevent occurrence of the event, the reference data being stored in association with the at least one service, wherein the reference data are determined by:

monitoring the one or more parameters during a time period, thereby providing monitoring data; and using the monitoring data to generate the reference data, wherein the reference data comprises a table having one or more columns, each column representing a parameter of the one or more parameters, each column comprising a set of parameter values each associated with a time point of the time period at which the parameter has the parameter value; and redeploying resources based on the updated topology graph.

13. A system of a distributed computing system providing at least one service, wherein the at least one service is provided by resources of the distributed computing system, wherein the resources are represented by a topology graph comprising storage, application and database server nodes joined by edges indicative of relationships between nodes, wherein data associated with the topology graph being stored in the computing system, the system comprising:

a computer processor, the computer processor adapted for:

receiving requests to provide the at least one service;

deploying the at least one service on the resources in accordance with the topology graph;

using the resources to provide the at least one service;

monitoring one or more predefined parameters indicative of respective one or more operating characteristics of the distributed computing system when providing the at least one service;

comparing values of the one or more predefined parameters with respective predetermined performance threshold values, wherein the performance threshold values are determined based on a service level agreement, SLA, wherein the SLA comprises at least one service level objective, SLO, the performance threshold values being indicative of the respective operating characteristics prior to an event;

providing a set of rules for selecting a combination of application, storage and database server nodes to meet the at least one SLO for each parameter of the one or more parameters, wherein data associated with the set of rules are stored in the computing system;

in response to a determination, at a time t0, that at least one parameter value of the one or more parameters values is higher or equal to the respective performance threshold value, using reference data and the set of rules to update the topology graph to prevent occurrence of the event, the reference data being stored in association with the at least one service, wherein the reference data are determined by:

monitoring the one or more parameters during a time period, thereby providing monitoring data; and using the monitoring data to generate the reference data, wherein the reference data comprises a table having one or more columns, each column representing a parameter of the one or more parameters, each column comprising a set of parameter values each associated with a time point of the time period at which the parameter has the parameter value; and redeploying resources based on the updated topology graph.

* * * * *